United States Patent
Ji et al.

(10) Patent No.: US 9,338,177 B2
(45) Date of Patent: *May 10, 2016

(54) PREFIX HIJACKING DETECTION DEVICE AND METHODS THEREOF

(71) Applicant: AT&T Intellectual Property I, L.P., Atlanta, GA (US)

(72) Inventors: Lusheng Ji, Randolph, NJ (US); Dan Pei, Jersey City, NJ (US); Tongquing Qiu, Smyrna, GA (US); Jia Wang, Randolph, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 423 days.

This patent is subject to a terminal disclaimer.

(21) Appl. No.: 13/894,156

(22) Filed: May 14, 2013

(65) Prior Publication Data

US 2013/0254887 A1   Sep. 26, 2013

Related U.S. Application Data

(63) Continuation of application No. 12/640,663, filed on Dec. 17, 2009, now Pat. No. 8,443,076.

(51) Int. Cl.
  G06F 15/173   (2006.01)
  H04L 29/06   (2006.01)
  H04L 12/24   (2006.01)
  G06F 15/16   (2006.01)

(52) U.S. Cl.
  CPC ............ H04L 63/1416 (2013.01); H04L 41/12 (2013.01)

(58) Field of Classification Search
  CPC .................................................. H04L 63/1416

USPC ......................................................... 709/224
See application file for complete search history.

(56) References Cited

U.S. PATENT DOCUMENTS 7,823,202 B1   10/2010   Nucci et al.

OTHER PUBLICATIONS

RIPE RIS Raw Data, http://www.ripe.netJprojects/ris/rawdata.html.
Aiello et al., "Origin Authentication in Interdomain Routing," In Proc. of ACM CCS, Oct. 2003.
Alexa, http://www.alexa.com/.
Ballani et al. "A Study of Prefix Hijacking and Interception in the Internet," In Proc. ACM SIGCOMM, Aug. 2007.
Butler et al. "Optimizing BGP Security by Exploiting Path Stability," In Proc. ACM CCS, Nov. 2006.
Cardellini et al. "Redirection Algorithms for Load Sharing in Distributed Web-Server Systems," ICDCS, pp. 528-535, 1999.
Gao, "On Inferring Autonomous System Relationships in the Internet," IEEE/ACM Transactions on Networking, 2001.
Goodell et al. "Working Around BGP: An Incremental Approach to Improving Security and Accuracy of Interdomain Routing," In Proc. NDSS, Feb. 2003.

(Continued)

*Primary Examiner* — Joseph Greene
(74) *Attorney, Agent, or Firm* — Akerman LLP; Michael K. Dixon; Mammen (Roy) P. Zachariah, Jr.

(57) ABSTRACT

A method of placing prefix hijacking detection modules in a communications network includes selecting a set of candidate locations. For each candidate location, a detection coverage ratio with respect to a target Autonomous System is calculated. Based on the relative size of the coverage ratios, proposed locations for the prefix hijacking detection modules are determined.

20 Claims, 4 Drawing Sheets

(56) References Cited

OTHER PUBLICATIONS

Hu et al., "SPV: Secure Path Vector Routing for Securing BGP," In Proc. ACM SIGCOMM, Aug. 2004.
iPlane, http://iplane.cs.washington.edu/.
Karlin et al. "Pretty Good BGP: Protecting BGP by Cautiously Selecting Routes," In Proc. IEEE ICNP, Nov. 2006.
Kent et al., "Secure Border Gateway Protocol (S-BGP). IEEE JSAC Special Issue on Network Security," Apr. 2000.
Kruegel et al., "Topology-based Detection of Anomalous BGP Messages," In Proc. RAID, Sep. 2003.
Lad et al. "PHAS: A Prefix Hijack Alert System. In Proc." USENIX Security Symposium, Aug. 2006.
Lad et al., "Understanding Resiliency of Internet Topology Against Prefix Hijack Attacks," In Proc. IEEE/IFIP DSN, Jun. 2007.
PlanetLab, http://www.planet-lab.org.
Rekhter et al., "Border Gateway Protocol 4. RFC 4271," Internet Engineering Task Force, Jan. 2006.
Smith et al. "Securing the Border Gateway Routing Protocol," In Proc. Global Internet, Nov. 1996.
Subramanian et al., "Characterizing the Internet Hierarchy from Multiple Vantage Points," In INFOCOM, 2002.
Zhang et al. "Practical Defenses Against BGP Prefix Hijacking," In Proc. of CoNext, Dec. 2007.
Zhang et al. "Ispy: Detecting IP Prefix Hijacking on My Own," In SIGCOMM '08, pp. 327-338, New York, NY, USA, 2008. ACM.
Zhao et al. "Detection of Invalid Routing Announcement in the Internet," In Proc. IEEE/IFIP DSN, Jun. 2002.

PREFIX HIJACKING DETECTION DEVICE AND METHODS THEREOF

CROSS REFERENCE TO RELATED APPLICATIONS

This application is a continuation of U.S. patent application Ser. No. 12/640,663, filed on Dec. 17, 2009, now U.S. Pat. No. 8,443,076, which is hereby incorporated by reference in its entirety.

FIELD OF THE DISCLOSURE

The present disclosure generally relates to communications networks, and more particularly relates to detecting prefix hijacking attacks in a communications network.

BACKGROUND

Communications networks, such as the Internet, are used increasingly to deliver a variety of services, including telephone communications, audio and video entertainment, financial transactions, and others. Such communications networks are subject to security risks, such as attempts by individuals or groups to inhibit the delivery of such services. Because of the number and amount of services delivered over communication networks, such security risks can have a large financial impact, both on service providers and their customers.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
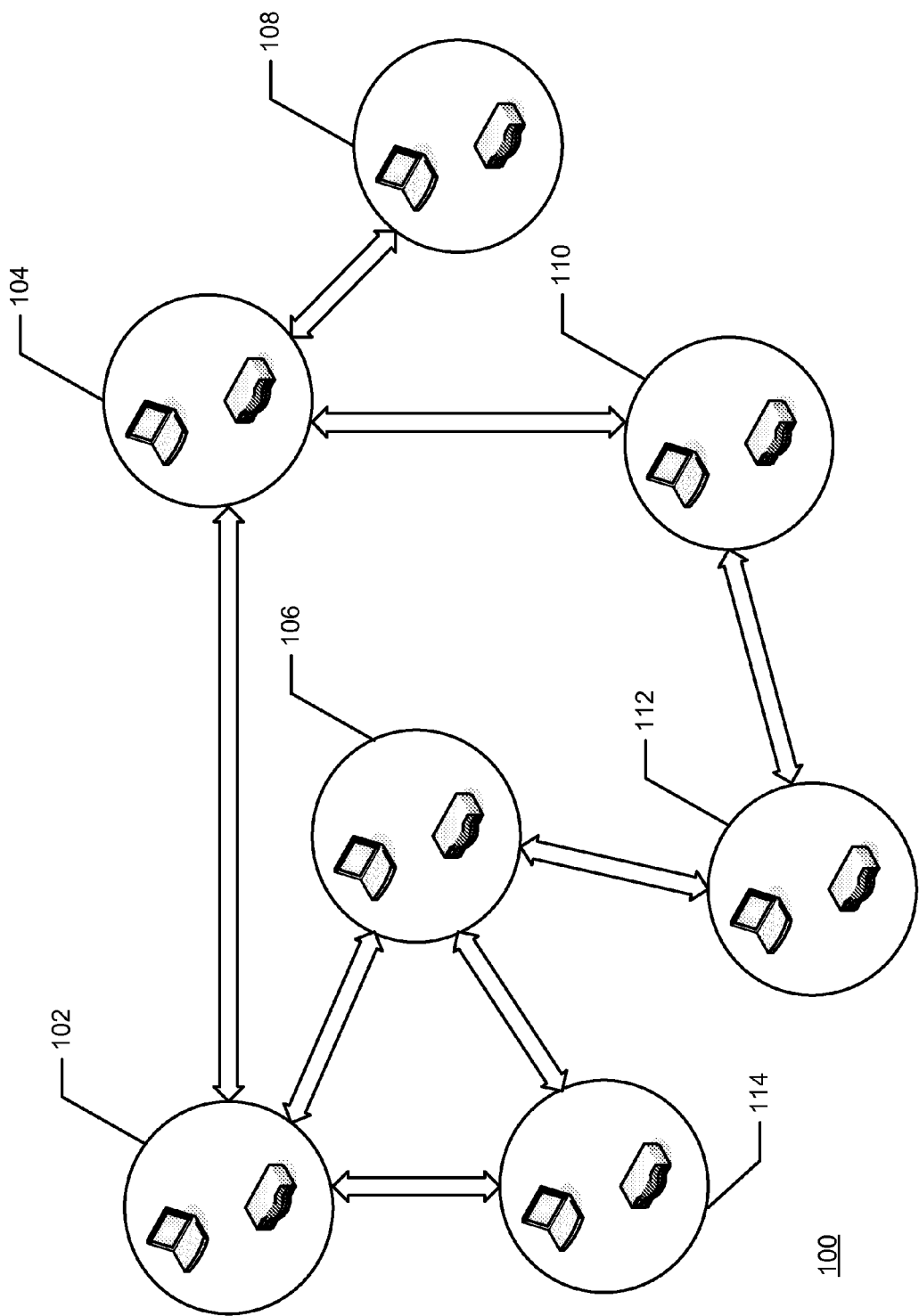
FIG. 1 is a block diagram illustrating a communications network in accordance with one embodiment of the present disclosure.

FIG. 1 shows a block diagram of a communications network 100 in accordance with one embodiment of the present disclosure. The communications network 100 includes a number of Autonomous Systems (ASes), including AS 102, AS 104, AS 106, AS 108, AS 110, and AS 112. As used herein, an Autonomous System refers to a set of network communications equipment, such as routers, servers, clients, and the like, such that the AS presents a common routing policy to the communication network. In an embodiment, an AS may be administrated by a single entity, such as a service provider or content provider. For example, an AS may be owned by an Internet Service Provider (ISP). In another embodiment, an AS may be owned by multiple entities that have agreed upon the common routing policy presented to the communications network. Because the allocation and distribution of Internet Protocol (IP) addresses from authorities are managed in address blocks in which IP addresses of the same block share the same address prefix, an AS may own one or more IP address prefixes to assign to equipments in the AS. Also because IP address prefix is used as index for organizing data routing entries by routers, the collection of network equipments that are assigned with IP addresses from the same IP address prefix form an individual routable network entity commonly referred to as a sub-network, and this common IP prefix hence becomes the address of the sub-network. In the illustrated embodiment, it is assumed that each of the ASes in the communication network 100 includes network communications equipment associated with a set of Internet Protocol (IP) addresses sharing one or more common prefixes. Thus, for example, AS 102 includes a set of communications equipment associated with a set of IP addresses having one prefix, while AS 104 includes a set of communications equipment associated with a set of IP addresses having a different prefix. For purposes of discussion, if an AS includes a set of communications equipment associated with a particular prefix, the AS is referred to as owning that prefix. It will be appreciated that an AS can own more than one prefix.

Each of the ASes is connected to other ASes via communication links between its routers and routers of the neighboring ASes. Routers that have such external connectivity are referred to as border routers and a pair of ASes that at least one border router of one AS has a direct communication link with at least one border of the other AS are referred to as neighboring ASes. Conceptually the inter-connectivity among ASes can be viewed as a communication backbone that allows communications between the neighboring ASes. However, in the illustrated embodiment, each AS is not directly connected to every other AS. Connected ASes can communicate with each other using an agreed protocol. For purposes of discussion, it is assumed that the ASes illustrated in FIG. 1 communicate using the Border Gateway Protocol (BGP). Using BGP one AS can communicate using IP prefixes and the corresponding AS level path to reach the prefixes with each other. Such communications of prefixes are referred to as BGP updates. In one embodiment, ASes initially send BGP updates for prefixes of their own with the AS level path initialized to the corresponding sender AS to neighboring ASes. Upon receiving these BGP updates ASes update their routing tables and send the received BGP updates, with their own AS identifier appended to the corresponding AS level path of the BGP updates, to their neighboring ASes to propagate the knowledge. A BGP update can be illustrated with reference to an example, where AS 102 communicates an update to AS 104, indicating that AS 102 owns a set of prefixes. In response, AS 104 can communicate the information to its routers and other communications equipment, which adjust their routing policies accordingly. In particular, if a network node at AS 104 originates a communication targeted to a network node associated with an IP address having one of the prefixes indicated by the update, the routers and other communications equipment ensures that the message is communicated from AS 104 to AS 102. The communications equipment of AS 102 then routes the message to the target network node. To enhance communication efficiency, a BGP update can include information in addition to owned prefixes, such as suggested routing tables for messages targeted to a particular prefix. In one embodiment, BGP updates are communicated by routers at the edge of a particular AS. Such routers are referred to as a BGP router.

Because of the connections between ASes, the communication network 100 is subject to a security risk referred to as prefix hijacking, where a network node, such as a BGP router in an AS, provides a BGP update with a prefix that the AS does not own. In other words, prefix hijacking can occur when an AS indicates that it owns an AS that it does not, in fact, own. Prefix hijacking can occur intentionally or accidentally due to a BGP router malfunction. In either case, the hijacking can result in communications being misrouted. Communication of information that results, or could result, in a prefix hijacking is referred to herein as a prefix hijacking event. For example, communication of a BGP update having incorrect prefix information, indicating that an AS owns a prefix it does not in fact own, is a prefix hijacking event. Prefix hijacking events can also be referred to as prefix hijacking attacks.

To illustrate a prefix hijacking event, assume that AS 104 is the owner of prefix 100, so that messages targeted to addresses having that prefix should be routed to AS 104. AS 106 communicates a BGP update to AS 102 indicating that it is the owner of prefix 100. This BGP update is a prefix hijacking event. If AS 102 considers that the route via AS 106 is better than the route via AS 104 for prefix 100, routers of AS 102 will change the corresponding routing entries for prefix 100 to replace AS 104 with AS 106 as the next hop AS for forwarding packets. Accordingly, if a network node of AS 102 originates a communication targeted to an address associated with prefix 100, it will be misrouted to AS 106 rather than to AS 104. The misrouting can result in one or more of at least three possible outcomes: blackholing, interception, and imposture. If a misrouted message is blackholed, it is simply dropped by the AS that receives the misrouted message. A misrouted message can also be intercepted by a malicious entity, such as a hacker, for eavesdropping or recording. In addition, a malicious entity can become an impostor for the message target, responding to the source as if it were the proper target for the message. Any of these three outcomes can negatively impact network communications.

To inhibit prefix hijacking, it can be useful to detect when a hijacking event occurs. One way of detecting prefix hijacking is to insert devices at a network's ASes, where the devices are configured to detect network activity indicative of a prefix hijacking event. These devices are referred to herein as detection towers, or alternatively as hijack detection modules. Detection towers can detect prefix hijacking events in a number of ways. For example, in one embodiment a detection tower receives BGP updates from other ASes as if the tower were a BGP router. The detection tower can compare the BGP update to a database of known prefixes associated with different ASes and, based on the comparison, determine if the BPG update represents a prefix hijacking event. For example, if the BGP update associates an AS with a prefix that the database indicates is already associated with a different AS, the detection tower can determine that the BGP update represents a prefix hijacking event.

It is sometimes not feasible to locate a detection tower at each AS, due to cost or other considerations. Accordingly, as described herein, a computer device can be configured to select one or more locations for placement of detection towers to provide a designated amount of detection coverage for prefix hijacking events in the communications network 100. This can be better understood with reference to FIG. 2.

Figure 2:
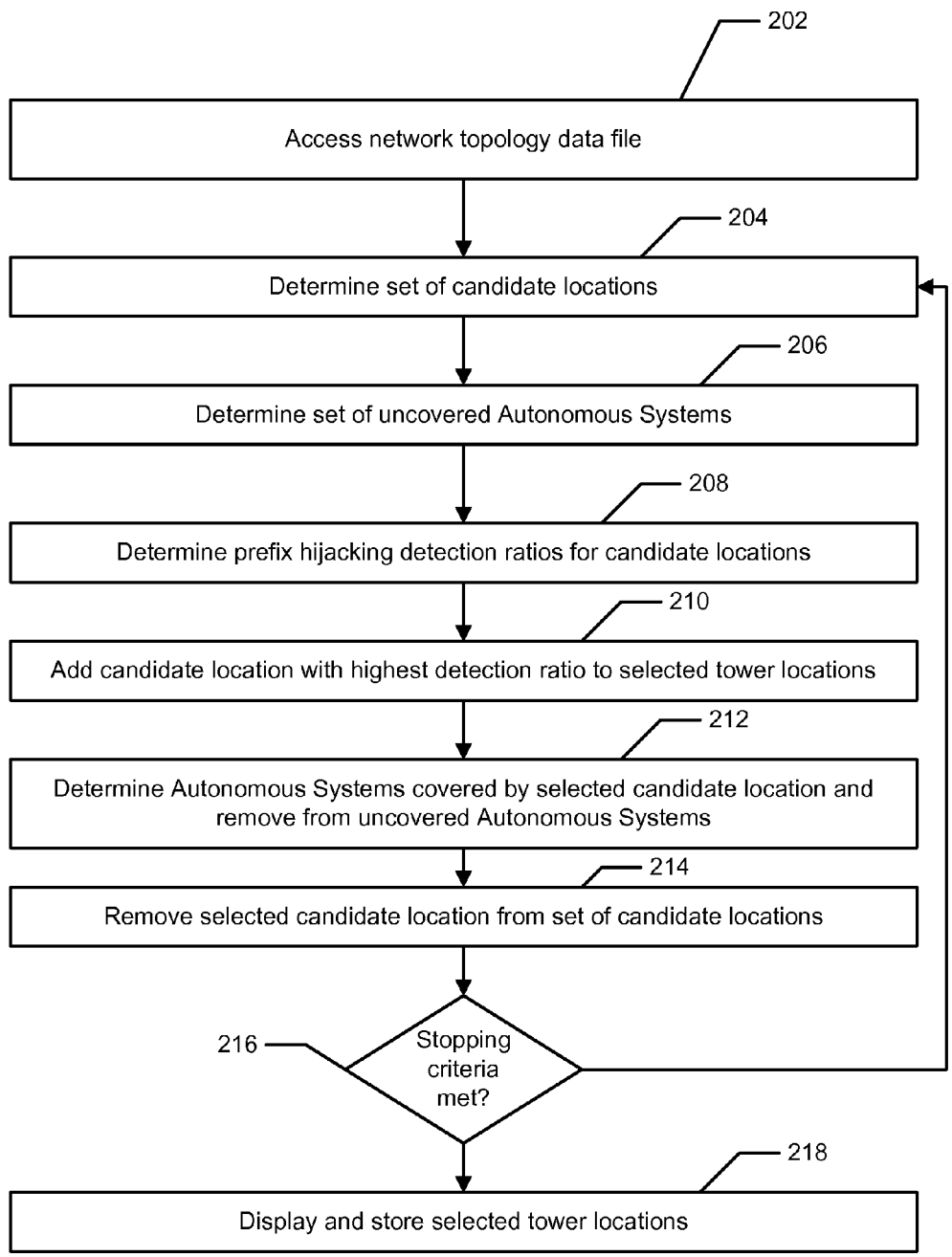
FIG. 2 is a flow diagram of a method of determining locations for prefix hijacking detection modules in a communications network in accordance with one embodiment of the present disclosure.

FIG. 2 shows a flow diagram illustrating a method of selecting locations for detection towers in a communications network in accordance with one embodiment of the present disclosure. At block 202, a computer device, such as a desktop computer, laptop, server, workstation, or the like, accesses a data file representative of a network topology. As used herein, network topology refers to the arrangement of ASes in a network including the locations of the ASes relative to each other and the connections between ASes. It will be appreciated that a location in the network, including the location of a detection tower, may not refer to a physical location, but instead refer to the AS where the detection tower is located. A detection tower is located in an AS when it has access to the BGP updates or other routing information provided to that AS such that the detection tower is able to detect prefix hijacking events. In an embodiment, a detection tower is located in an AS when it is associated with a network address having a prefix owned by the AS. Thus, the location of a detection tower can indicate its location in the address space of a communications network, rather than the physical location of the device.

At block 204, the computer device determines a set of candidate locations for placement of a detection tower. Each candidate location represents an AS where the detection tower could be located. The set of candidate locations can include all ASes in the network, or may be based on one or more heuristics. For example, the set of candidate locations can include only those ASes connected to a threshold number of other ASes.

At block 206, a set of ASes that are not yet covered by detection towers is determined. An AS is not yet covered if a prefix hijacking event initiated at the AS and targeted to a designated AS will not be detected based on the current proposed locations of detection towers. Accordingly, if no locations for detection towers have been determined, all ASes of the network will not yet be covered and will be included in the set. If any prefix hijacking event launched from an AS and targeted to a designated AS will be detected by a detection tower located at a proposed location, the AS is covered with respect to the target AS.

At block 208, the computer device determines detection coverage ratios for each of the candidate locations. The coverage ratio is based on the detection coverage for a candidate location. The detection coverage for a candidate location is number of ASes from which a detection tower located at the candidate location can detect an otherwise undetected hijacking event on a designated target AS. This can be illustrated by reference to an example illustrated at FIG. 3.

Figure 3:
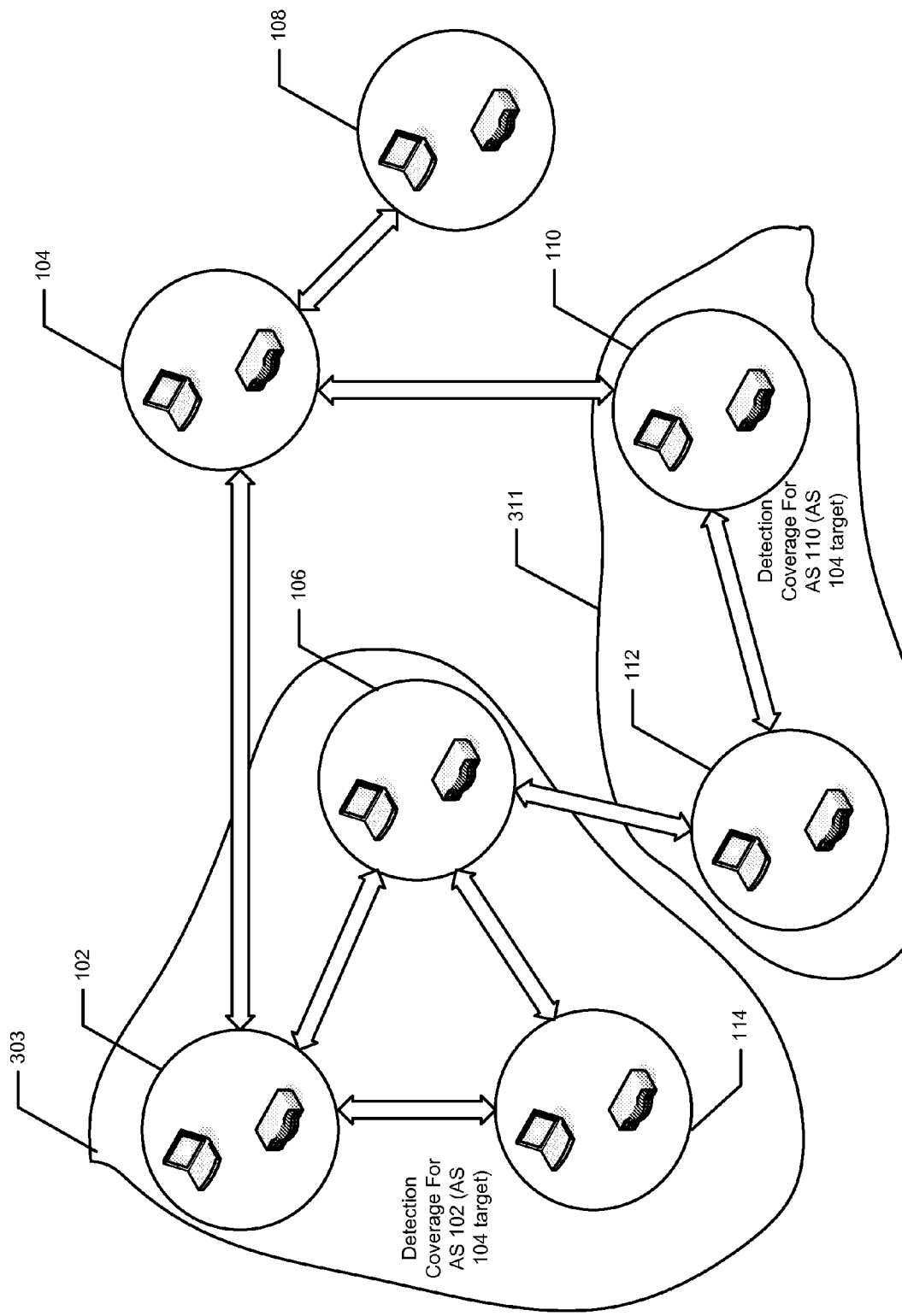
FIG. 3 is a block diagram illustrating detection coverage areas for the communication network of FIG. 1 in accordance with one embodiment of the present disclosure.

FIG. 3 illustrates example detection coverage areas for the communication network 100 of FIG. 1. The example of FIG. 3 assumes that the designated target of a prefix hijacking attempt is prefixes in AS 104. Further, the example of FIG. 3 assumes that the candidate locations for the detection tower are AS 102 and AS 110. The detection coverage is illustrated as area 303, which includes AS 102, AS 106, and AS 114, because a detection tower located at AS 102 can detect hijacking events targeted to AS 104 that originate from AS 102, AS 114, and AS 106. In particular, a hijacking event originating from AS 102, AS 114 or AS 106 and targeted to AS 104 would result in communication of a BGP update to a BGP router at AS 102, resulting in detection of the hijacking event by the detection tower. Accordingly, the detection coverage for AS 102 with respect to a potential prefix hijacking event targeted at AS 104 is three ASes, referring to AS 102, AS 106, and AS 114. The detection coverage area for AS 110 is illustrated as area 311. Accordingly, the detection coverage for AS 110 is two ASes, because a detection tower located at AS 110 can detect hijacking events targeted to AS 104 that originate from AS 110 and AS 112.

The detection coverage ratio for a candidate detection module location is determined by dividing the detection coverage for the candidate location by the number of ASes that can launch a hijacking event to the target AS. Thus, referring to the above example, it is assumed that ASes 102, 106, 110, 112, and 114 can all launch hijacking events with respect to the target AS 104. It is further assumed that AS 108 cannot launch a hijacking event with respect to the target AS 104, because a BGP update from AS 108 would only be provided to AS 104, which would recognize the BGP update as a hijack attempt. Accordingly, the number of ASes that can launch a hijacking event to the target AS is five. Therefore, the detection coverage ratio for AS 102 is 3/5, while the detection coverage ratio for AS 110 is 2/5.

In an embodiment, the detection coverage ratio for the candidate locations is determined based on the number of uncovered ASes. In other words, if the computer device determines, based on the locations of detection towers, that a prefix hijacking event originating from a designated AS will be detected by the towers, the designated AS will not be included in the calculations of the coverage ratios. To illustrate using the above example, assume that detection towers have been placed such that a detection tower has been placed at AS 112, such that a hijacking event originating from the AS 112 and targeted to AS 104 will be detected. Accordingly, the AS 112 is not considered when determining the detection coverage ratios with respect to AS 104. Thus, the detection coverage ratio for AS 102 in this example will be 3/4, because AS 112 is not considered as an AS that can launch a potentially undetected hijacking event with respect to target AS 104. Similarly, the detection coverage ratio for AS 110 will be 1/4.

At block 210, the candidate location with the highest coverage ratio is added to the selected locations for placement of detection towers. At block 212, the ASes covered by the selected detection tower locations for a designated target are determined, and these ASes are removed from the set of uncovered ASes. At block 214, the candidate location that was selected for placement of a detection tower is removed from the set of candidate locations.

At block 216, it is determined whether stopping criteria are met. In one embodiment, the stopping criteria are met after a threshold number of locations for detection towers have been selected. In another embodiment, the stopping criteria are met when it is determined that the gain in detection coverage from placing a detection tower at the most-recently selected candidate location is below a threshold. In still another embodiment, the stopping criteria are met when it is determined that the number of ASes in the set of uncovered ASes is below a threshold. In yet another embodiment, the stopping criteria is met when it is determined that the number of ASes in the set of uncovered ASes is zero.

If, at block 216, it is determined that the stopping criteria have been met, the set of selected locations for detection towers is displayed at a display screen of the computer device, and is also stored at the computer device. The stored set of selected locations can subsequently be accessed, and detection towers placed in each of the ASes indicated by the stored set of locations.

If, at block 216, it is determined that the stopping criteria have not been met, the method flow returns to block 206 and the set of candidate locations is again determined. Accordingly, the computer device iteratively selects detection tower locations that yield the largest detection coverage ratio on remaining uncovered ASes until the stopping criteria is met. In another embodiment, the method illustrated at FIG. 2 can be repeated for each of a set of designated target ASes.

The above described method can be expressed mathematically, where the detection coverage of a tower v with respect to a target AS d is expressed as DC(v,d). Accordingly, the detection coverage of a set of towers V with respect to a target AS d is expressed as:

$$DC(V, d) = \bigcup_{v \in V} DC(v, d)$$

The detection coverage ratio can be computed by dividing DC(V,d) by the total number of ASes which can potentially hijack a prefix of the target AS d. Selection of locations for detection towers is a set cover problem. In particular, assume H represents the set of all possible uncovered ASes. $H_{v,d}$ is the set of uncovered ASes from which a detection tower v can detect a hijacking event on target d. The family Z consists of all possible subsets of H. The set of locations for detection towers is the minimum subset $H_{v,d}$ such that:

$$H = \bigcup_{H_{v,d} \in Z} H_{v,d}$$

The set covering problem is referred to as a non-deterministic polynomial (NP) complete problem. In the method described above, the set of uncovered ASes is equal to the set H. For each iteration, a detection tower v that yields the largest detection ratio on the set of remaining uncovered ASes is selected. The set of remaining uncovered ASes is then updated to remove the ASes covered by a detection tower located at the selected location. Iterations continue until stopping criteria are met.

Figure 4:
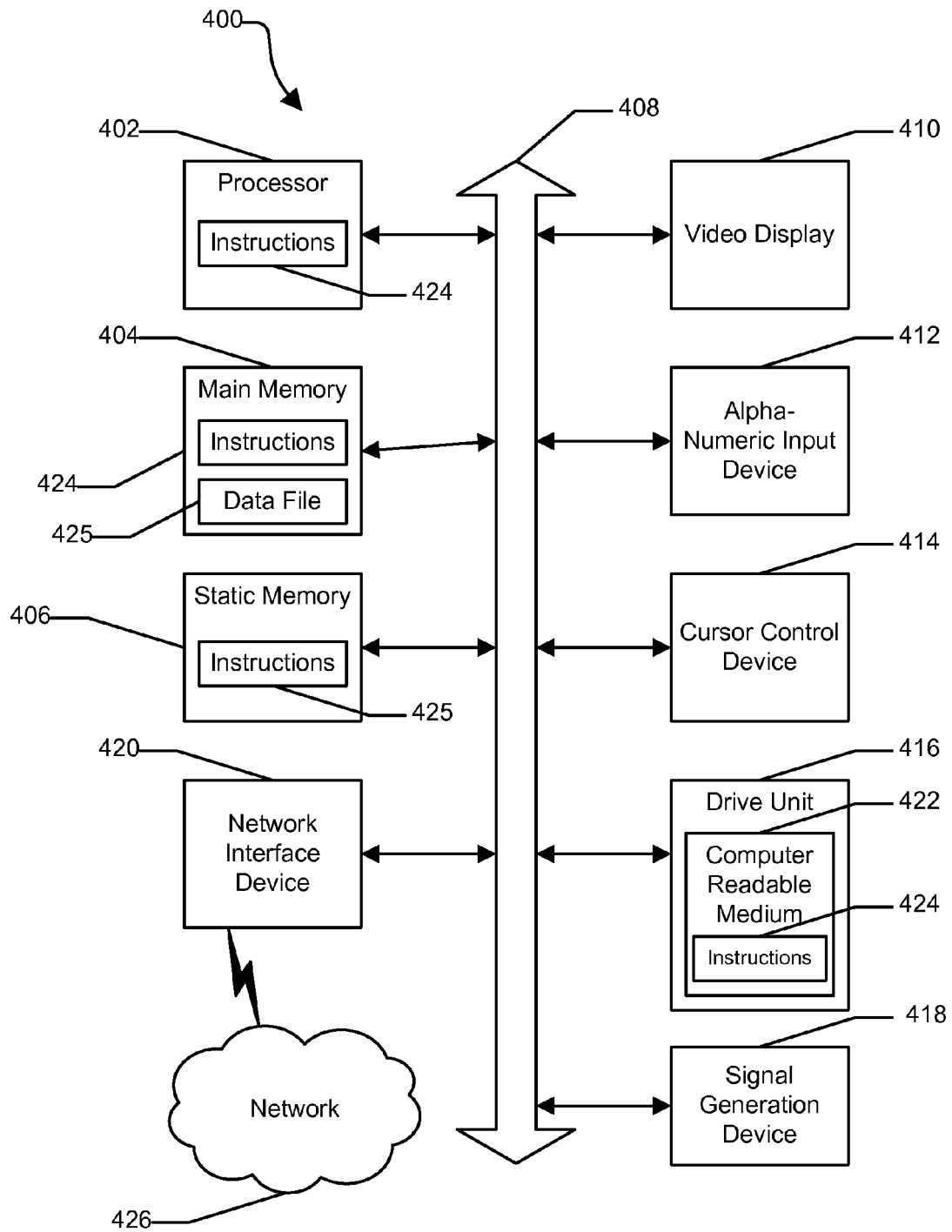
FIG. 4 is a block diagram of a computer device in accordance with one embodiment of the present disclosure.

FIG. 4 shows an illustrative embodiment of a general computer system 400 in accordance with at least one embodiment of the present disclosure. The computer system 400 can include a set of instructions that can be executed to cause the computer system to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The main memory 404 can also store a data file 425 representing a network topology for performance of one or more of the methods described herein. The network interface device 420 can provide connectivity to a network 426, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 or the data file 425 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of placing prefix hijacking detection modules in a communication network, the method comprising:
   determining, by a computing device and by utilizing instructions from memory that are executed by a processor, a first subset of network locations of a plurality of network locations that are subject to prefix hijacking events, wherein the first subset of network locations is contained within a first autonomous system;
   selecting, by the computing device, a first network location of the plurality of network locations for placing a first hijacking detection module that detects prefix hijacking events directed against the first subset of network locations, wherein selecting the first network location comprises determining a plurality of candidate locations based on the plurality of network locations and determining a plurality of detection coverage ratios corresponding to the plurality of candidate locations, and wherein the first network location is contained within a second autonomous system associated with the first autonomous system; and
   wherein detecting the prefix hijacking events comprises:
      determining that a border gateway protocol update related to a prefix represents a prefix hijacking event based upon an identification that the prefix is already associated with the second autonomous system and is not associated with an autonomous system claiming ownership of the prefix in the border gateway protocol update; and
   wherein determining the plurality of detection coverage ratios comprises:
      determining a first detection coverage ratio for a first candidate location of the plurality of candidate locations by determining a first number of autonomous systems from which a second hijacking detection module at the first candidate location can detect prefix hijacking events launched at a first target autonomous system, and dividing the first number of autonomous systems by a total number of autonomous systems of the network topology that can potentially hijack a prefix of the first target autonomous system.

2. The method of claim 1, further comprising determining the first subset of network locations of the plurality of network locations that are subject to the prefix hijacking events based on accessing a file representative of a network topology.

3. The method of claim 1, further comprising receiving border gateway protocol updates from the first autonomous system.

4. The method of claim 1, further comprising comparing prefixes that are claimed by the first autonomous system with prefixes claimed by other autonomous systems that border the second autonomous system.

5. The method of claim 1, further comprising selecting the first network location of the plurality of network locations for placing the first hijacking detection module based on the plurality of detection coverage ratios.

6. The method of claim 1, wherein determining the plurality of detection coverage ratios further comprises:
   determining a second detection coverage ratio for a second candidate location of the plurality of candidate locations by determining a second number of autonomous systems from which a second hijacking detection module at the second candidate location can detect prefix hijacking events launched at the first target autonomous system, and dividing the second number by the total number of autonomous systems of the network topology that can potentially hijack a prefix of the first target autonomous system.

7. The method of claim 1, further comprising adding a candidate location of the plurality of candidate locations to a selected location for placement of additional hijacking detection modules if the candidate location has a highest coverage ratio.

8. The method of claim 1, further comprising determining if stopping criteria are met after a threshold number of locations for placing hijacking detection modules have been selected.

9. The method of claim 8, further comprising displaying the locations for placing the hijacking detection modules if the stopping criteria is determined to have been met on a display screen of the computing device.

10. A system for placing prefix hijacking detection modules in a communication network, the system comprising:
   a memory that stores instructions;
   a processor that executes the instructions to perform operations, the operations comprising:
      determining a first subset of network locations of a plurality of network locations that are subject to prefix hijacking events, wherein the first subset of network locations is contained within a first autonomous system;
      selecting a first network location of the plurality of network locations for placing a first hijacking detection module that detects prefix hijacking events directed against the first subset of network locations, wherein selecting the first network location comprises determining a plurality of candidate locations based on the plurality of network locations and determining a plurality of detection coverage ratios corresponding to the plurality of candidate locations, and wherein the first network location is contained within a second autonomous system associated with the first autonomous system; and
      wherein detecting the prefix hijacking events comprises:
         determining that a border gateway protocol update related to a prefix represents a prefix hijacking event based upon an identification that the prefix is already associated with the second autonomous system and is not associated with an autonomous system claiming ownership of the prefix in the border gateway protocol update; and
      wherein determining the plurality of detection coverage ratios comprises:
         determining a first detection coverage ratio for a first candidate location of the plurality of candidate locations by determining a first number of autonomous systems from which a second hijacking detection module at the first candidate location can detect prefix hijacking events launched at a first target autonomous system, and dividing the first number of autonomous systems by a total number of autonomous systems of the network topology that can potentially hijack a prefix of the first target autonomous system.

11. The system of claim 10, wherein the operations further comprise adding a candidate location of the plurality of candidate locations to a selected location for placement of additional hijacking detection modules if the candidate location has a highest coverage ratio.

12. The system of claim 10, wherein the operations further comprise receiving border gateway protocol updates from the first autonomous system.

13. The system of claim 10, wherein the operations further comprise determining the first subset of network locations of the plurality of network locations that are subject to the prefix hijacking events based on accessing a file representative of a network topology.

14. The system of claim 10, wherein the operations further comprise comparing prefixes that are claimed by the first autonomous system with prefixes claimed by other autonomous systems that border the second autonomous system.

15. The system of claim 10, wherein the operations further comprise determining if stopping criteria are met after a threshold number of locations for placing hijacking detection modules have been selected.

16. The system of claim 15, wherein the operations further comprise displaying the locations for placing the hijacking detection modules if the stopping criteria is determined to have been met, wherein the locations are displayed on a display screen of a computing device associated with the processor.

17. The system of claim 10, wherein determining the plurality of detection coverage ratios further comprises:
    determining a second detection coverage ratio for a second candidate location of the plurality of candidate locations by determining a second number of autonomous systems from which a second hijacking detection module at the second candidate location can detect prefix hijacking events launched at the first target autonomous system, and dividing the second number by the total number of autonomous systems of the network topology that can potentially hijack a prefix of the first target autonomous system.

18. The system of claim 10, wherein the operations further comprise selecting the first network location of the plurality of network locations for placing the first hijacking detection module based on the plurality of detection coverage ratios.

19. A computer-readable device comprising instructions, which when loaded and executed by a processor, cause the processor to perform operations comprising:
    determining, by utilizing instructions from memory that are executed by a processor, a first subset of network locations of a plurality of network locations that are subject to prefix hijacking events, wherein the first subset of network locations is contained within a first autonomous system;
    selecting a first network location of the plurality of network locations for placing a first hijacking detection module that detects prefix hijacking events directed against the first subset of network locations, wherein selecting the first network location comprises determining a plurality of candidate locations based on the plurality of network locations and determining a plurality of detection coverage ratios corresponding to the plurality of candidate locations, and wherein the first network location is contained within a second autonomous system associated with the first autonomous system; and
    wherein detecting the prefix hijacking events comprises:
        determining that a border gateway protocol update related to a prefix represents a prefix hijacking event based upon an identification that the prefix is already associated with the second autonomous system and is not associated with an autonomous system claiming ownership of the prefix in the border gateway protocol update; and
    wherein determining the plurality of detection coverage ratios comprises:
        determining a first detection coverage ratio for a first candidate location of the plurality of candidate locations by determining a first number of autonomous systems from which a second hijacking detection module at the first candidate location can detect prefix hijacking events launched at a first target autonomous system, and dividing the first number of autonomous systems by a total number of autonomous systems of the network topology that can potentially hijack a prefix of the first target autonomous system.

20. The computer-readable device of claim 19, wherein the operations further comprise determining the first subset of network locations of the plurality of network locations that are subject to the prefix hijacking events based on accessing a file representative of a network topology.

* * * * *